(12) United States Patent
Kubota

(10) Patent No.: US 12,158,598 B2
(45) Date of Patent: Dec. 3, 2024

(54) DISPLAY

(71) Applicant: TOPPAN PRINTING CO., LTD., Tokyo (JP)

(72) Inventor: Masashi Kubota, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 525 days.

(21) Appl. No.: 17/484,232

(22) Filed: Sep. 24, 2021

(65) Prior Publication Data

US 2022/0011481 A1 Jan. 13, 2022

Related U.S. Application Data

(63) Continuation of application No. PCT/JP2020/006493, filed on Feb. 19, 2020.

(30) Foreign Application Priority Data

Mar. 28, 2019 (JP) .................. 2019-064029

(51) Int. Cl.
*G02B 5/18* (2006.01)
*B32B 7/023* (2019.01)
(Continued)

(52) U.S. Cl.
CPC ............ *G02B 5/1861* (2013.01); *B32B 7/023* (2019.01); *B42D 25/328* (2014.10);
(Continued)

(58) Field of Classification Search
CPC .. G02B 5/1861; G02B 5/1814; B42D 25/328; B42D 25/435; B32B 7/023; B32B 2307/416; B32B 2307/418; B32B 2457/20
(Continued)

(56) References Cited

U.S. PATENT DOCUMENTS

2004/0101676 A1* 5/2004 Phillips ................ B42D 25/355
428/323
2008/0309996 A1* 12/2008 Cowan .................... G02B 5/32
359/10
(Continued)

FOREIGN PATENT DOCUMENTS

EP 2 505 377 A1 10/2012
JP 2003-520986 A 7/2003
(Continued)

OTHER PUBLICATIONS

JP-2010173220-A English translation—MINAGAWA—Aug. 12, 2010.*
(Continued)

*Primary Examiner* — Sharrief I Broome
(74) *Attorney, Agent, or Firm* — Foley & Lardner LLP

(57) ABSTRACT

A display of the present invention includes a multilayer film and at least one reflective surface. The multilayer film includes a laminate of at least two dielectric layers having refractive indices different from each other, and the laminate has a first major surface and a second major surface. The laminate has at least one recess formed in the first major surface. At least one reflective surface which faces the second major surface of the laminate, and is configured to direct light in a visible range, which has entered the multilayer film and then emerged at an angle of emergence from the second major surface, to be incident on the second major surface at an angle of incidence which is different from the angle of emergence of the light.

13 Claims, 10 Drawing Sheets

(51) Int. Cl.
  *B42D 25/328* (2014.01)
  *B42D 25/435* (2014.01)

(52) U.S. Cl.
  CPC ......... *B42D 25/435* (2014.10); *G02B 5/1814* (2013.01); *B32B 2307/416* (2013.01); *B32B 2307/418* (2013.01); *B32B 2457/20* (2013.01)

(58) Field of Classification Search
  USPC ........................................................ 359/566
  See application file for complete search history.

(56) References Cited

U.S. PATENT DOCUMENTS

| | | | | |
|---|---|---|---|---|
| 2013/0330486 | A1* | 12/2013 | Shields | G09G 3/34 |
| | | | | 428/29 |
| 2014/0268261 | A1 | 9/2014 | Kubo et al. | |
| 2018/0222243 | A1* | 8/2018 | Yamada | B42D 25/373 |
| 2019/0059340 | A1* | 2/2019 | Brown | B32B 27/08 |

FOREIGN PATENT DOCUMENTS

| | | | |
|---|---|---|---|
| JP | 2009-134093 A | | 6/2009 |
| JP | 2009-134094 A | | 6/2009 |
| JP | 2009-288328 | | 12/2009 |
| JP | 2010173220 A | * | 8/2010 |
| JP | 2014-008746 A | | 1/2014 |
| JP | 2014-016418 A | | 1/2014 |
| JP | 2016-078254 A | | 5/2016 |
| JP | 2016-080963 A | | 5/2016 |
| JP | 2017-185668 A | | 10/2017 |
| KR | 2005-0013893 A | | 2/2005 |
| WO | WO-2013/084960 A1 | | 6/2013 |
| WO | WO-2015/079652 A1 | | 6/2015 |
| WO | WO-2019/004229 A1 | | 1/2019 |

OTHER PUBLICATIONS

International Searching Authority, "International Search Report," issued in connection with International Patent Application No. PCT/JP2020/006493, dated Mar. 17, 2020, 7 pages.

International Searching Authority, "Written Opinion," issued in connection with International Patent Application No. PCT/JP2020//006493, dated Mar. 17, 2020, 4 pages.

Extended European Search Report issued in corresponding EP Application No. 20777415.9 dated May 6, 2022 (8 pages).

Office Action issued in corresponding Japanese Patent Application No. 2021-508269 dated Mar. 5, 2024 (7 pages).

Office Action issued in corresponding Japanese Patent Application No. 2021-508269 dated Aug. 6, 2024 (8 pages).

* cited by examiner

DISPLAY

CROSS-REFERENCE TO RELATED PATENT APPLICATIONS

This application is a continuation application filed under 35 U.S.C. § 111 (a) claiming the benefit under 35 U.S.C. §§ 120 and 365 (c) of International Patent Application No. PCT/JP2020/006493, filed on Feb. 19, 2020, which is based upon and claims the benefit of priority to Japanese Patent Application Nos. 2019-064029, filed on Mar. 28, 2019; the disclosures of which are incorporated herein by reference in their entireties.

TECHNICAL FIELD

The present invention relates to a display.

BACKGROUND

Holograms which are difficult to counterfeit or replicate are conventionally used to prove articles as being genuine products. For example, attachment of a transparent film equipped with a hologram to a card recorded with a personal information such as a facial image protects the personal information from being altered. In addition, using holograms in banknotes or securities prevent their unauthorized duplication. In recent years, recording a facial image using a hologram on an ID (identification) card or the like has also been proposed (Patent Literature 1 and 2).

CITATION LIST

Patent Literature

[PTL 1] JP 2014-8746 A; [PTL 2] JP 2014-16418 A.

SUMMARY OF THE INVENTION

As described above, holograms, which are difficult to counterfeit or duplicate have been used in various articles for which it is desired to prevent their unauthorized duplication.

However, recording a facial image on demand on a blank medium using a hologram requires transferring of the hologram pixel by pixel onto a blank medium. Therefore, manufacturing a large number of displays in a short time using the above method requires a plurality of manufacturing apparatuses to be operated at the same time.

An object of the present invention is to provide a technique for manufacturing a display for displaying an image by structural color in a decreased time.

According to a first aspect of the present invention, there is provided a display which includes a multilayer film and at least one reflective surface. The multilayer film includes a laminate of at least two dielectric layers having refractive indices different from each other, and the laminate has a first major surface and a second major surface. The laminate has at least one recess formed in the first major surface. At least one reflective surface which faces the second major surface of the laminate, and is configured to direct light in a visible range, which has entered the multilayer film and then emerged at an angle of emergence from the second major surface, to be incident on the second major surface at an angle of incidence which is different from the angle of emergence of the light. The term "visible range" used here means a wavelength range of 350 nm to 750 nm.

According to a second aspect of the present invention, there is provided a display-equipped article which includes a display according to the first aspect and an article retaining the display.

According to a third aspect of the present invention, there is provided a blank medium on which an image is to be recorded by irradiation of a laser beam thereto. The blank medium includes a laminate and at least one reflective surface. The laminate is formed of at least two dielectric layers having refractive indices different from each other. The laminate has a first major surface and a second major surface. The laminate has at least one recess formed in the first major surface by the irradiation of the laser beam thereto. At least one reflective surface which faces the second major surface of the laminate, and is configured to direct light in a visible range, which has emerged at an angle of emergence from the second major surface, to be incident on the second major surface at an angle of incidence which is different from the angle of emergence of the light.

According to a fourth aspect of the present invention, there is provided a blank medium-equipped article which includes a blank medium according to the third aspect and an article retaining the blank medium.

According to a fifth aspect of the present invention, there is provided a method of manufacturing a display including a step of performing the irradiation of the laser beam onto a blank medium according to the third aspect to thereby form the at least one recess.

According to a sixth aspect of the present invention, there is provided a method of manufacturing a display-equipped article including a step of manufacturing a display using the method according to the fifth aspect and a step of retaining the display on an article.

According to a seventh aspect of the present invention, there is provided a method of manufacturing a display-equipped article including a step of performing the irradiation of the laser beam onto the blank medium of a blank medium-equipped article according to the fourth aspect to thereby form the at least one recess.

DETAILED DESCRIPTION

Embodiments of the present invention of will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

Figure 1:
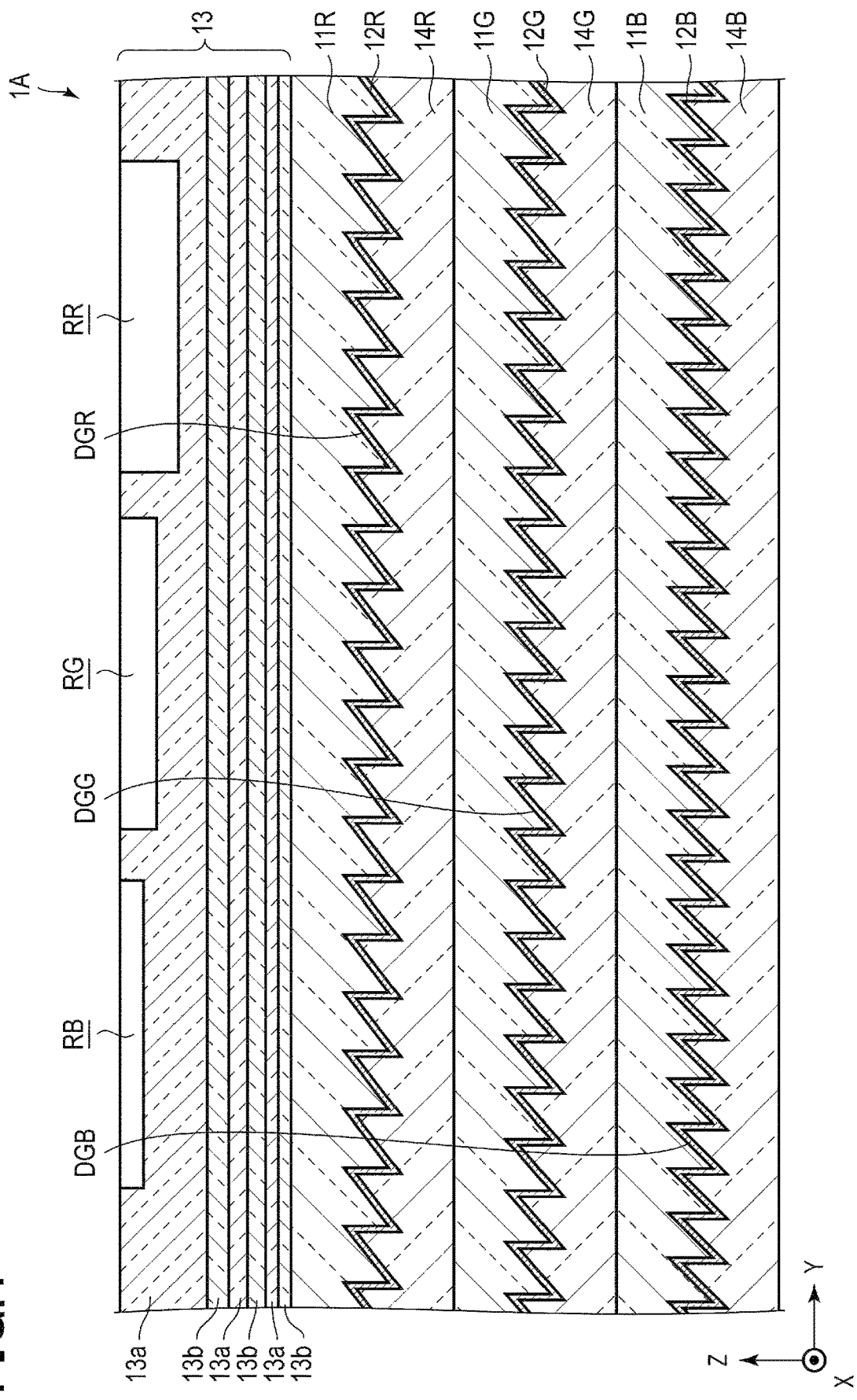
FIG. 1 is a schematic cross-sectional view illustrating a display according to a first embodiment of the present invention.

FIG. 1 is a schematic cross-sectional view illustrating a display according to a first embodiment of the present invention.

A display 1A includes a multilayer film 13, front layers 11R, 11G and 11B, reflective layers 12R, 12G and 12B, and back layers 14R, 14G and 14B. The surface of the display 1A on the multilayer film 13 side is a front surface, and the back surface thereof is a back surface. Hereinafter, of the two main surfaces of each layer, a surface closer to the front surface of the display 1A is referred to as a front surface, and a surface closer to the back surface of the display 1A is referred to as a back surface.

The multilayer film 13 is a dielectric multilayer film including a laminate formed of at least two dielectric layers having refractive indices different from each other. The multilayer film 13 is composed of a laminate formed by alternately laminating dielectric layers 13a and 13b having refractive indices different from each other. As will be described later, the multilayer film 13 may further include a protective layer which covers the front surface of the laminate. The protective layer may have a monolayer structure, or may have a multilayer structure.

The thickness of each layer constituting the multilayer film 13 may be, for example, in the range of 5 nm or more and 500 um or less.

Materials that can be used for each layer constituting the multilayer film 13 may be, for example, transparent dielectric materials such as zinc sulfide and titanium dioxide. Herein, the multilayer film 13 is formed of two kinds of dielectric layers 13a and 13b having refractive indices (materials) different from each other. However, the multilayer film 13 may be formed of three or more dielectric layers having refractive indices (materials) different from each other.

The laminate has formed in the front surface thereof, a first recess RR, a second recess RG, and a third recess RB, as at least one recess. The first recess RR, the second recess RG, and the third recess RB are arranged in one of the dielectric layers 13a which is located closest to the front surface of the laminate. The third recess RB may be omitted. The second recess RG may also be omitted.

The first recess RR, the second recess RG, and the third recess RB have depths different from each other. Although the first recess RR, the second recess RG, and the third recess RB are increasingly shallow in depth in this order, any of them may be the shallowest, or any of them may be the deepest.

In FIG. 1, one of the dielectric layers 13a, located closest to the front surface of the laminate, is drawn thicker than the other dielectric layers 13a and 13b, for ease of understanding the difference in depths of the recesses. One of the dielectric layers 13a, located closest to the front surface of the laminate, may have the same thickness as, or may be thinner than, any of the other dielectric layers 13a and 13b.

When white light is made incident at a first angle of incidence on the multilayer film 13, a portion of the multilayer film 13 where there is no recess shows, for example, a high transmittance over the entire visible range or a low transmittance over the entire visible range. As an example, it is assumed that when white light is made incident at the first angle of incidence on the multilayer film 13, the multilayer film 13 shows a low transmittance over the entire visible range at the position where these recesses are not provided. "White light" refers to light having substantially equal intensity over the entire visible range.

The multilayer film 13 includes a first portion aligned with the first recess RR, a second portion aligned with the second recess RG, a third portion aligned with the third recess RB, and portions having no recesses, and all the portions show transmission spectra different from each other when white light is made incident at the first angle of incidence. The first to third portions have wavelengths of maximum or minimum transmittance in the visible range that are different from each other when white light is made incident on the portions at the first angle of incidence.

For example, a transmission spectrum of white light, which is made incident at the first angle of incidence on the multilayer film 13, shows a ratio of transmittance in a first wavelength range to transmittance in other wavelength ranges being larger in the first portion of the multilayer film 13 aligned with the first recess RR than in the portions of the multilayer film 13 without any recess, and shows a maximum transmittance at the first wavelength in the first wavelength range. In this case, the transmission spectrum of white light made incident on the multilayer film 13 at the first angle of incidence shows, for example, a ratio of transmittance in a second wavelength range to transmittance in other wavelength ranges being larger in the second portion of the multilayer film 13 aligned with the second recess RG than in the portions without any recess, and shows a maximum transmittance at the second wavelength in the second wavelength range. The transmission spectrum of white light made incident on the multilayer film 13 at the first angle of incidence shows, for example, a ratio of transmittance in a third wavelength range to transmittance in other wavelength ranges being larger in the third portion of the multilayer film 13 aligned with the third recess RB than in the portions without any recess, and shows a maximum transmittance at the third wavelength in the third wavelength range.

Alternatively, the transmission spectrum of white light made incident on the multilayer film 13 at the first angle of incidence shows a ratio of transmittance in the first wavelength range to transmittance in other wavelength ranges being smaller in the first portion of the multilayer film 13 aligned with the first recess RR than in the portions without any recess, and shows a minimum transmittance at the first wavelength in the first wavelength range. The transmission spectrum of white light made incident on the multilayer film 13 at the first angle of incidence shows, for example, a ratio of transmittance in the second wavelength range to transmittance in other wavelength ranges being smaller in the second portion of the multilayer film 13 aligned with the second recess RG than in the portions without any recess, and shows a minimum transmittance at the second wavelength in the second wavelength range. The transmission spectrum of white light made incident on the multilayer film 13 at the first angle of incidence shows, for example, a ratio of transmittance in the third wavelength range to transmittance in other wavelength ranges being smaller in the third portion of the multilayer film 13 aligned with the third recess RB than in the portions without any recess, and shows a minimum transmittance at the third wavelength in the third wavelength range.

As an example, it is assumed that the multilayer film 13 adopts the former configuration.

The first to third wavelength ranges are wavelength ranges different from each other, in the visible range. For example, the longest wavelength in the second wavelength range is shorter than the shortest wavelength in the first wavelength range, and the longest wavelength in the third wavelength range is shorter than the shortest wavelength in the second wavelength range. As an example, it is assumed that the first, second, and third wavelength ranges are red, green, and blue wavelength ranges, respectively.

The front layer 11R, the reflective layer 12R, and the back layer 14R are laminated on the back surface of the multilayer film 13 in this order. A front layer 11G, a reflective layer 12G, and a back layer 14G are laminated on the back layer 14R in this order. A front layer 11B, a reflective layer 12B and a back layer 14B are laminated on the back layer 14G in this order.

Each of the front layers 11R, 11G and 11B may be made of, for example, a transparent resin. The transparent resin may be a cured product of a thermosetting resin or a photocurable resin, a thermoplastic resin, an adhesive or a pressure sensitive adhesive. Each of these layers may have a monolayer structure, or may have a multilayer structure.

The back surfaces of the front layers 11R, 11G, and 11B are provided with the first, second, and third relief structures, respectively. The first, second, and third relief structures each allow the first reflective surface, which is the interface between the front layer 11R and the reflective layer 12R, the second reflective surface, which is the interface between the front layer 11G and the reflective layer 12G, and the third reflective surface, which is the interface between the front layer 11B and the reflective layer 12B to direct light, which has entered the multilayer film 13 as white light at a first angle of incidence and then emerged at an angle of emergence from the back surface of the multilayer film 13, to be incident on the back surface of the multilayer film 13 at a second angle of incidence which is different from the angle of emergence of the light.

The first relief structure forms a first blazed diffraction grating on the first reflective surface, the second relief structure forms a second blazed diffraction grating on the second reflective surface, and the third relief structure forms a third blazed diffraction grating on the third reflective surface. The first to third blazed diffraction gratings are parallel to each other in the arrangement direction of grooves or edges constituting them. The arrangement direction of the grooves or edges is parallel to the Y direction. The first to third blazed diffraction gratings have spatial frequencies of the grating lines different from each other. The first blazed diffraction grating has the lowest spatial frequency of grating lines, and the third blazed diffraction grating has the highest spatial frequency of grating lines. The magnitude relationship of the spatial frequencies of the grating lines between the first to third blazed diffraction gratings may be different from the above.

The first blazed diffraction grating has a defined blaze angle and a defined grating constant (line spacing) so that when white light is made incident on the multilayer film 13 at the first angle of incidence, the light (light at the first wavelength) transmitted through the first portion of the multilayer film 13 aligned with the first recess RR is made incident again on the multilayer film 13 at the second angle of incidence. When the light at the first wavelength is red light, the spatial frequency of grating lines constituting the first blazed diffraction grating may be set in the range of, for example, 950 lines/mm to 2050 lines/mm. The blaze angle of the first blazed diffraction grating may be, for example, in the range of 1° to 89°.

The second blazed diffraction grating has a defined blaze angle and a defined grating constant so that when white light is made incident on the multilayer film 13 at the first angle of incidence, the light (light at the second wavelength) transmitted through the second portion of the multilayer film 13 aligned with the second recess RG is made incident again on the multilayer film 13 at the second angle of incidence. When the light at the second wavelength is green light, the spatial frequency of grating lines constituting the second blazed diffraction grating may be set in the range of, for example, 950 lines/mm to 2050 lines/mm. The blaze angle of the second blazed diffraction grating may be made equal to, for example, the blaze angle of the first blazed diffraction grating.

The third blazed diffraction grating has a defined blaze angle and a defined grating constant so that when white light is made incident on the multilayer film 13 at the first angle of incidence, the light (light at the third wavelength) transmitted through the third portion of the multilayer film 13 aligned with the third recess RB is made incident again on the multilayer film 13 at the second angle of incidence. When the light at the third wavelength is blue light, the spatial frequency of grating lines constituting the third blazed diffraction grating may be set in the range of, for example, 950 lines/mm to 2050 lines/mm. The blaze angle of the third blazed diffraction grating may be made equal to, for example, the blaze angle of the first blazed diffraction grating.

The structure formed at the interfaces by the first to third relief structures may be a diffraction grating other than a blazed diffraction grating. In a case in which the structure formed at the interfaces by the first to third relief structures is a diffraction grating other than a blazed diffraction grating, and in a case in which the light at the first, second, and third wavelengths is red, green and blue light, respectively, the grating constants of the diffraction gratings may be, for example, within the range described above for the blazed diffraction grating.

When white light is made incident on the multilayer film 13 at the first angle of incidence, the structure in which the first to third relief structures are formed at the above interfaces does not necessarily have to have a function as a diffraction grating, as long as the structure is capable of allowing light that has been transmitted through the multilayer film 13 to enter the multilayer film 13 again at the second angle of incidence.

The reflective layers 12R, 12G, and 12B each cover the back surface of the front layers 11R, 11G, and 11B.

The reflective layers 12R and 12G are made of transparent materials. The reflective layers 12R and 12G each have refractive indices different from those of the front layers 11R and 11G. As the reflective layers 12R and 12G, for example, the materials exemplified for the dielectric layers 13a and 13b may be used.

The reflective layer 12B is made of a transparent material or an opaque material. In a case in which the reflective layer 12B is made of a transparent material, its refractive index is different from that of the front layer 11B. As the transparent materials, for example, the materials exemplified for the dielectric layers 13a and 13b may be used. As the opaque materials, for example, metallic materials such as aluminum, silver and an alloy containing one or more of these metallic materials may be used.

Each of the reflective layers 12R, 12G, and 12B may have a monolayer structure, or may have a multilayer structure.

The back layers 14R, 14G, and 14B cover the back surface of the reflective layers 12R, 12G, and 12B, respectively. Each of the front layers 14R, 14G and 14B may be made of, for example, a transparent resin. The back layer 14B may be opaque. The resin constituting each of the back layers 14R, 14G and 14B may be a cured product of a thermosetting resin or a photocurable resin, a thermoplastic resin, an adhesive or a pressure sensitive adhesive.

The front layer 11B, the reflective layer 12B and the back layer 14B may be omitted. Furthermore, the front layer 11G, the reflective layer 12G and the back layer 14G may also be omitted.

One or two of the front layer 11R, the reflective layer 12R and the back layer 14R may be omitted. However, when only the reflective layer 12R is omitted from these, materials having refractive indices different from each other are used for the front layer 11R and the back layer 14R.

Similarly, one or two of the front layer 11G, the reflective layer 12G and the back layer 14G may be omitted. However, when only the reflective layer 12G is omitted from these, materials having refractive indices different from each other are used for the front layer 11G and the back layer 14G.

Similarly, one or two of the front layer 11B, the reflective layer 12B and the back layer 14B may be omitted. However, when only the reflective layer 12B is omitted from these, materials having refractive indices different from each other are used for the front layer 11B and the back layer 14B.

Next, a method for manufacturing the display 1A is described.

Figure 2:
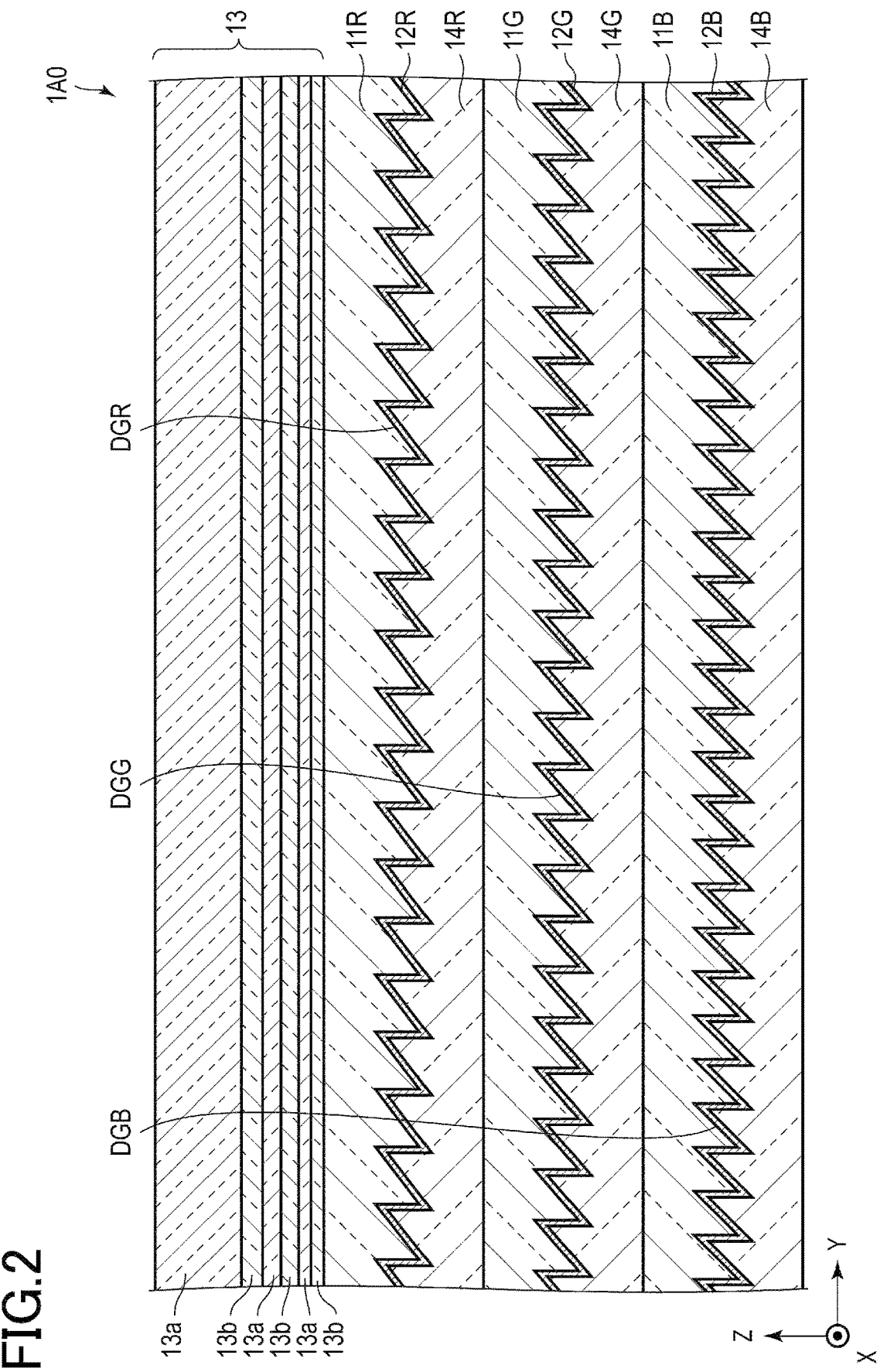
FIG. 2 is a schematic cross-sectional view illustrating a blank medium which can be used for manufacturing the display illustrated in FIG. 1.
Figure 3:
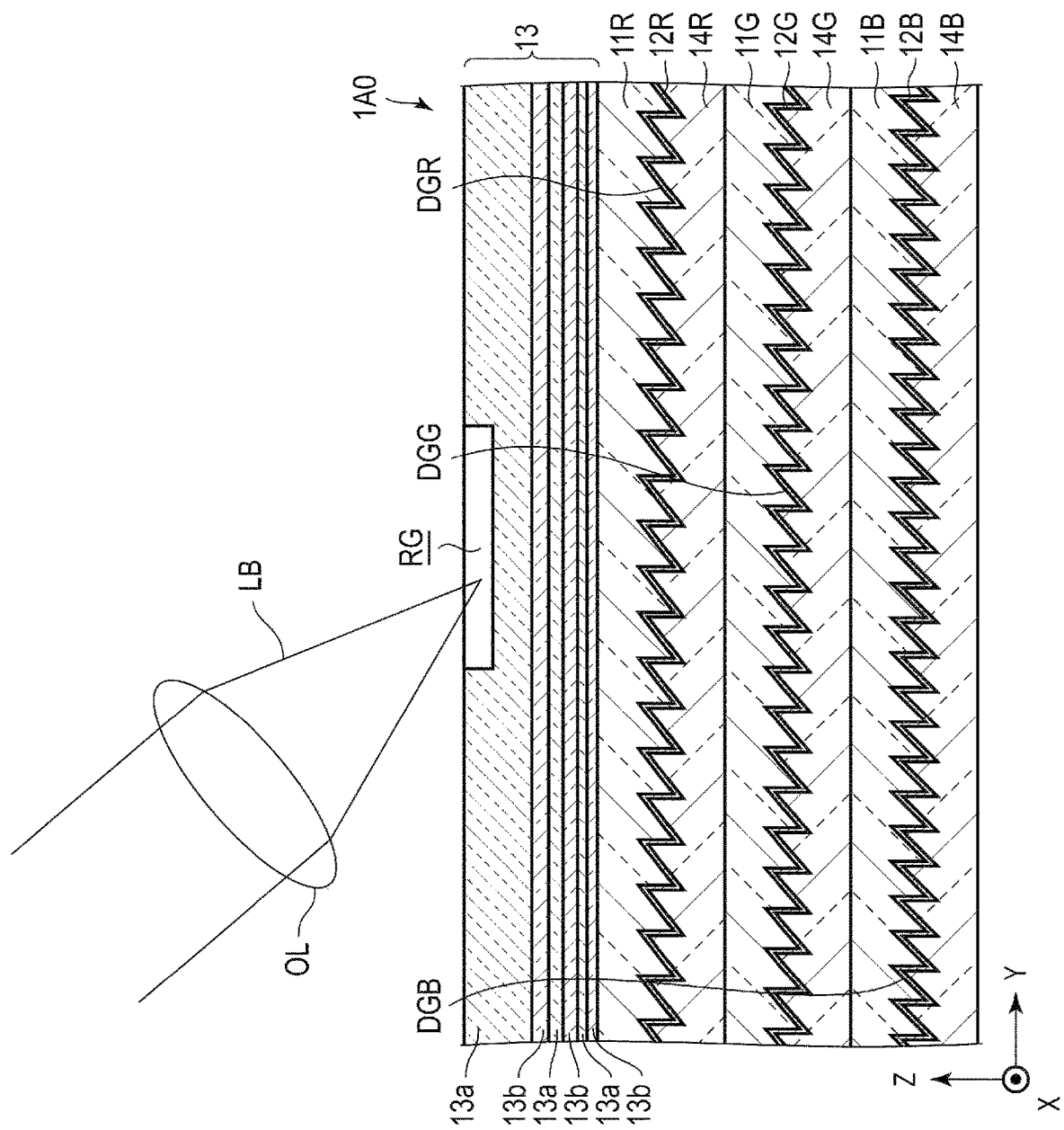
FIG. 3 is a cross-sectional view explaining a method of manufacturing the display illustrated in FIG. 1.

FIG. 2 is a schematic cross-sectional view illustrating a blank medium which can be used for manufacturing the display illustrated in FIG. 1. FIG. 3 is a cross-sectional view explaining a method for manufacturing the display illustrated in FIG. 1. In FIG. 3, the reference sign OL indicates an objective lens of a laser device.

In manufacturing the display 1A, first, the blank medium 1A0 illustrated in FIG. 2 is prepared. The blank medium 1A0 has the same structure as that of the display 1A except that the first recess RR, the second recess RG, and the third recess RB are not formed in the laminate.

Next, an image is recorded by irradiating a laminate with a laser beam. Specifically, a laser beam LB is applied to a region of the front surface of the laminate where the first recess RR, the second recess RG, and the third recess RB are to be formed. As a result, the first recess RR, the second recess RG, and the third recess RB are formed on the front surface of the laminate.

The diameter of the beam spot is typically several tens of micrometers. Therefore, the laser beam irradiation forms recesses having an opening diameter of, for example, several tens of micrometers or more. The depth of the recess formed by the irradiation of the laser beam LB can be adjusted, for example, by changing the number of irradiation times of the pulsed light, when a laser device is a pulsed laser. In this way, the display 1A is obtained.

Next, an optical effect of the display 1A is described.

Figure 4:
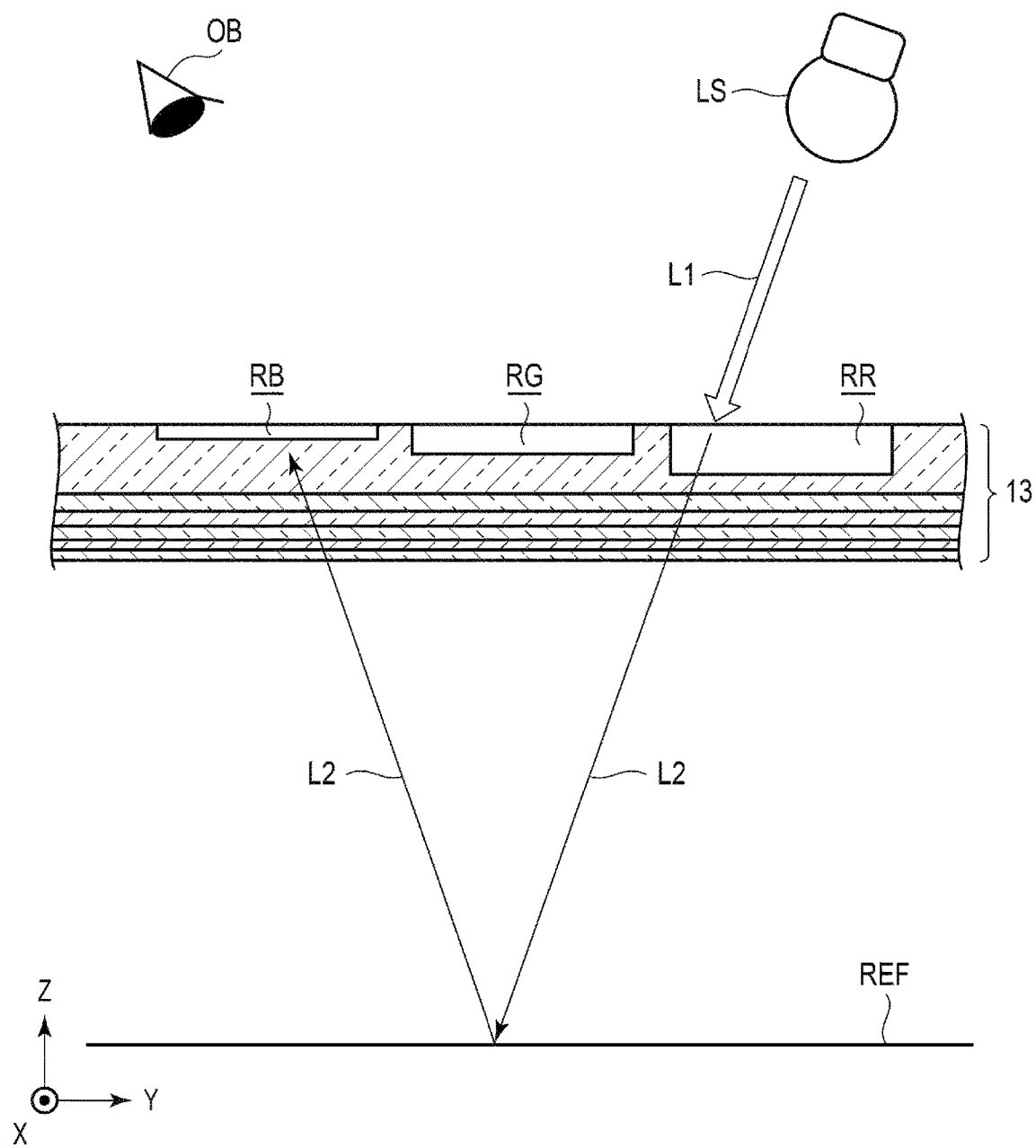
FIG. 4 is a schematic cross-sectional view illustrating an optical behavior caused when a display according to a comparative example is illuminated with white light.

FIG. 4 is a schematic cross-sectional view illustrating an optical behavior caused when a display according to a comparative example is illuminated with white light. FIG. 4 illustrates a display with a flat reflective surface REF being disposed parallel to the back surface of the multilayer film 13 and spaced apart from the back surface of the multilayer film 13, instead of disposing the first to third reflective surfaces on the back surface side of the multilayer film 13 in which the first recess RR, the second recess RG, and the third recess RB are provided.

For ease of understanding, it is assumed that the display is designed as follows. When white light L1 emitted by the light source LS is illuminated onto the front surface of the display, then at portions of the multilayer film 13 where there is no recess, none of the light components of white light incident at the first angle of incidence $\theta 1$ pass through the multilayer film 13 due to destructive interference, and thus are not reflected by the multilayer film 13. Of white light incident at the first angle of incidence $\theta 1$, light L2 having a first wavelength in the red region passes through the first portion of the multilayer film 13 aligned with the first recess RR, while light having other wavelengths does not pass through the multilayer film 13 due to destructive interference, and is not reflected by the multilayer film 13. Of white light incident at the first angle of incidence $\theta 1$, light having a second wavelength in the green region passes through the second portion of the multilayer film 13 aligned with the second recess RG, while light having other wavelengths does not pass through the multilayer film 13 due to destructive interference, and is not reflected by the multilayer film 13. Of white light incident at the first angle of incidence $\theta 1$, light having a third wavelength in the blue region passes through the third portion of the multilayer film 13 aligned with the third recess RB, while light having other wavelengths does not pass through the multilayer film 13 due to destructive interference, and is not reflected by the multilayer film 13.

As described above, of the white light L1 incident on the multilayer film 13 at the first angle of incidence θ1, the light L2 having the first wavelength in the red region passes through the first portion of the multilayer film 13 aligned with the first recess RR, while light having other wavelengths does not pass through the multilayer film 13, and is not reflected by the multilayer film 13. The light L2 as the transmitted light is reflected by the reflective surface REF. Since the reflective surface REF is disposed parallel to the back surface of the multilayer film 13, the light L2 as the reflected light is specularly reflected by the reflective surface REF. As a result, the light L2 enters the multilayer film 13 again at an angle of incidence equal to its angle of emergence.

Generally, the position of the light source LS is different from the position of an observer OB. Therefore, the first angle of incidence θ1 is greater than 0°, and the above-mentioned angle of emergence is also greater than 0°. Accordingly, the light L2 as the reflected light may re-enter the multilayer film 13 into a portion other than the first portion, for example, the third portion of the multilayer film 13 aligned with the third recess RB.

As described above, of white light incident at the first angle of incidence θ1, light having a third wavelength in the blue region passes through the third portion of the multilayer film 13, while light having other wavelengths does not pass through the multilayer film 13 due to destructive interference. Here, the light L2 includes a first wavelength range in a red region.

Therefore, the light L2 cannot pass through the multilayer film 13. Accordingly, the display cannot display the intended image to the observer OB.

Figure 5:
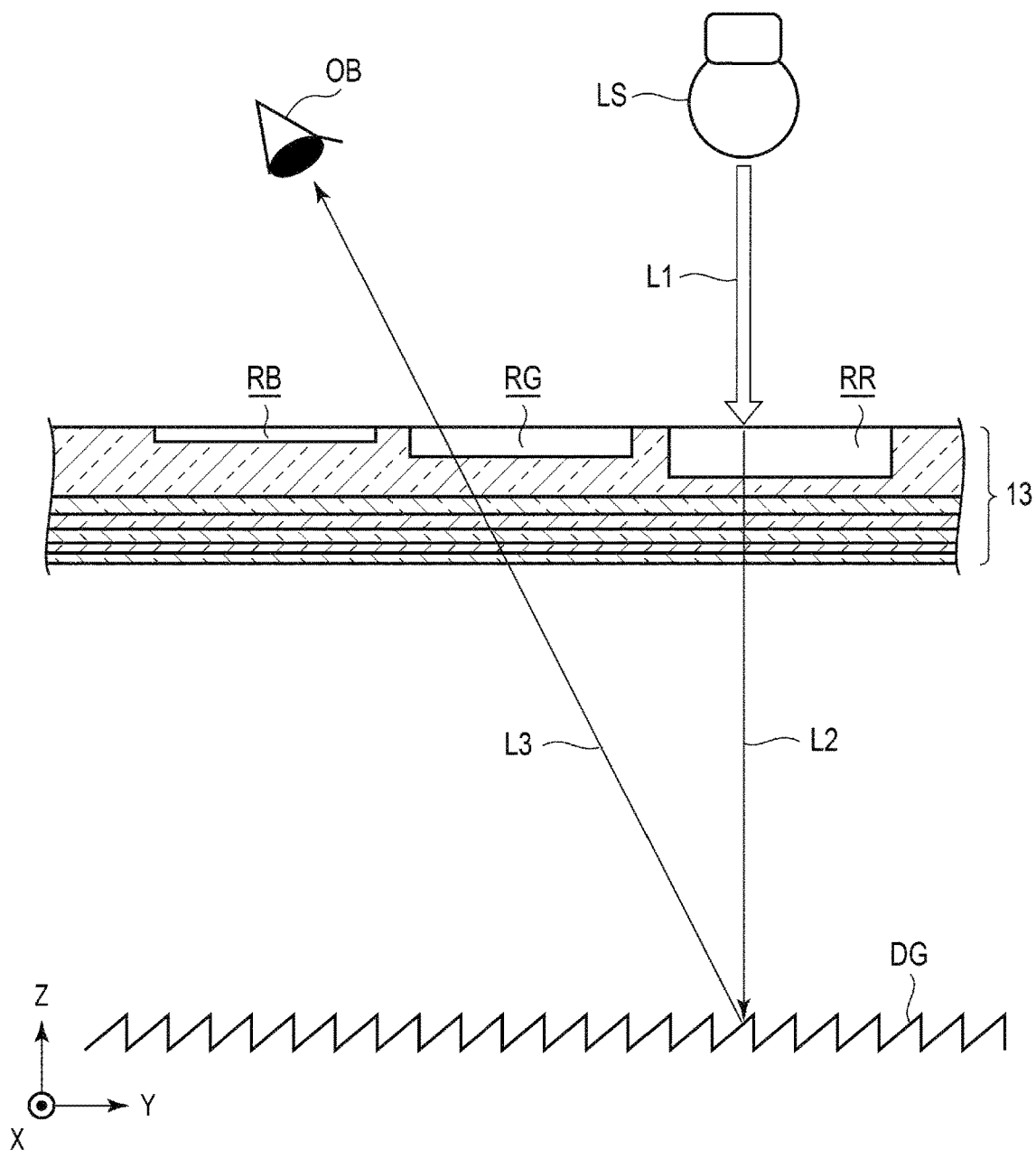
FIG. 5 is a schematic cross-sectional view illustrating an optical behavior caused when the display illustrated in FIG. 1 is illuminated with white light.

FIG. 5 is a schematic cross-sectional view illustrating an optical behavior caused when the display according to FIG. 1 is illuminated with white light. For the sake of simplicity, FIG. 5 shows only a first reflective surface DG as a structure disposed on the back surface side of the multilayer film 13. For ease of understanding, it is assumed that the multilayer film 13 is designed in the same manner as described with reference to FIG. 4.

In the display, of the white light L1 incident on the multilayer film 13 at the first angle of incidence θ1, the light L2 having a first wavelength in the red region passes through the first portion aligned with the first recess RR, while light having other wavelengths does not pass through the multilayer film 13, and is not reflected by the multilayer film 13. The light L2 as the transmitted light enters the first reflective surface DG.

The first reflective surface DG constitutes the first blazed diffraction grating. The first blazed diffraction grating, as described above, diffracts the light L2 at the first wavelength transmitted through the first portion of the multilayer film 13 aligned with the first recess RR, and then directs the light L2 into the multilayer film 13 again at the second angle of incidence θ2 in the form of light L3.

The transmission properties of the multilayer film 13 vary depending on the angle of incidence of the incident light. For example, the second portion of the multilayer film 13 aligned with the second recess RG and the third portion of the multilayer film 13 aligned with the third recess RB do not transmit the light L2 at the first wavelength incident at the first angle of incidence θ1. However, these portions may transmit the light L3 at the first wavelength incident at the second angle of incidence θ2 which is different from the first angle of incidence θ1. Other portions of the multilayer film 13 might also transmit the light L3 at the first wavelength incident at the second angle of incidence θ2.

Therefore, configuring the multilayer film 13 to allow the light L3 at the first wavelength to pass through these portions at the second angle of incidence θ2 enables the observer to perceive the light L3 without it being obstructed by the multilayer film 13. Therefore, the display can display the intended image to the observer OB.

As described above, the display 1A described with reference to FIG. 1 is manufactured by performing laser lithography on the multilayer film 13 of the blank medium 1A0 described with reference to FIG. 2. This laser lithography can be completed in a much shorter time compared to the process of transferring a hologram pixel by pixel onto a blank medium. Accordingly, the above technique achieves manufacturing a display for displaying an image by structural color in a decreased time.

As is clear from the previous description, the manufacturing of the display 1A requires an advanced and complex optical design and a high degree of accuracy. The display 1A is thus difficult to counterfeit.

Next, a second embodiment of the present invention will be described.

Figure 6:
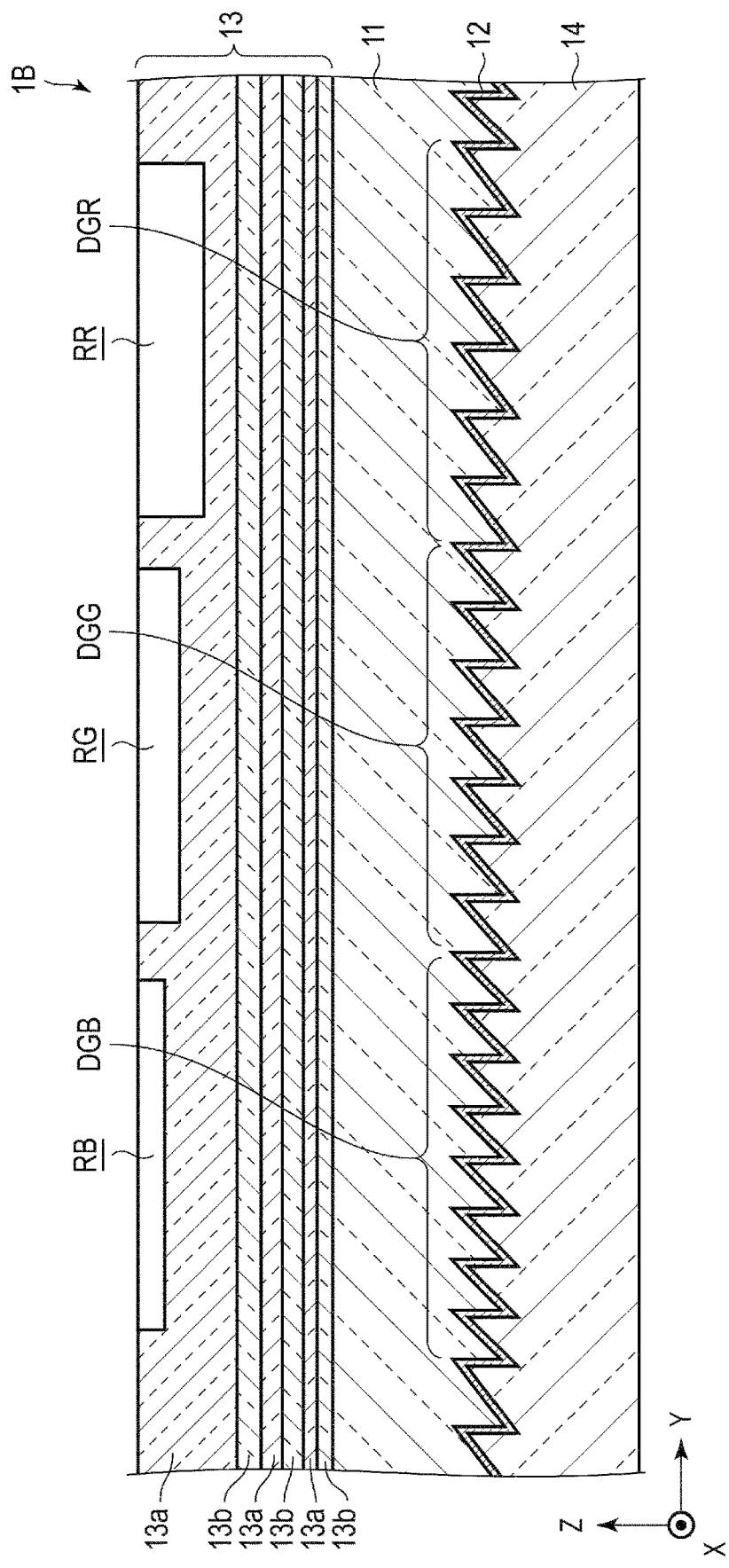
FIG. 6 is a schematic cross-sectional view illustrating a display according to a second embodiment of the present invention.
Figure 7:
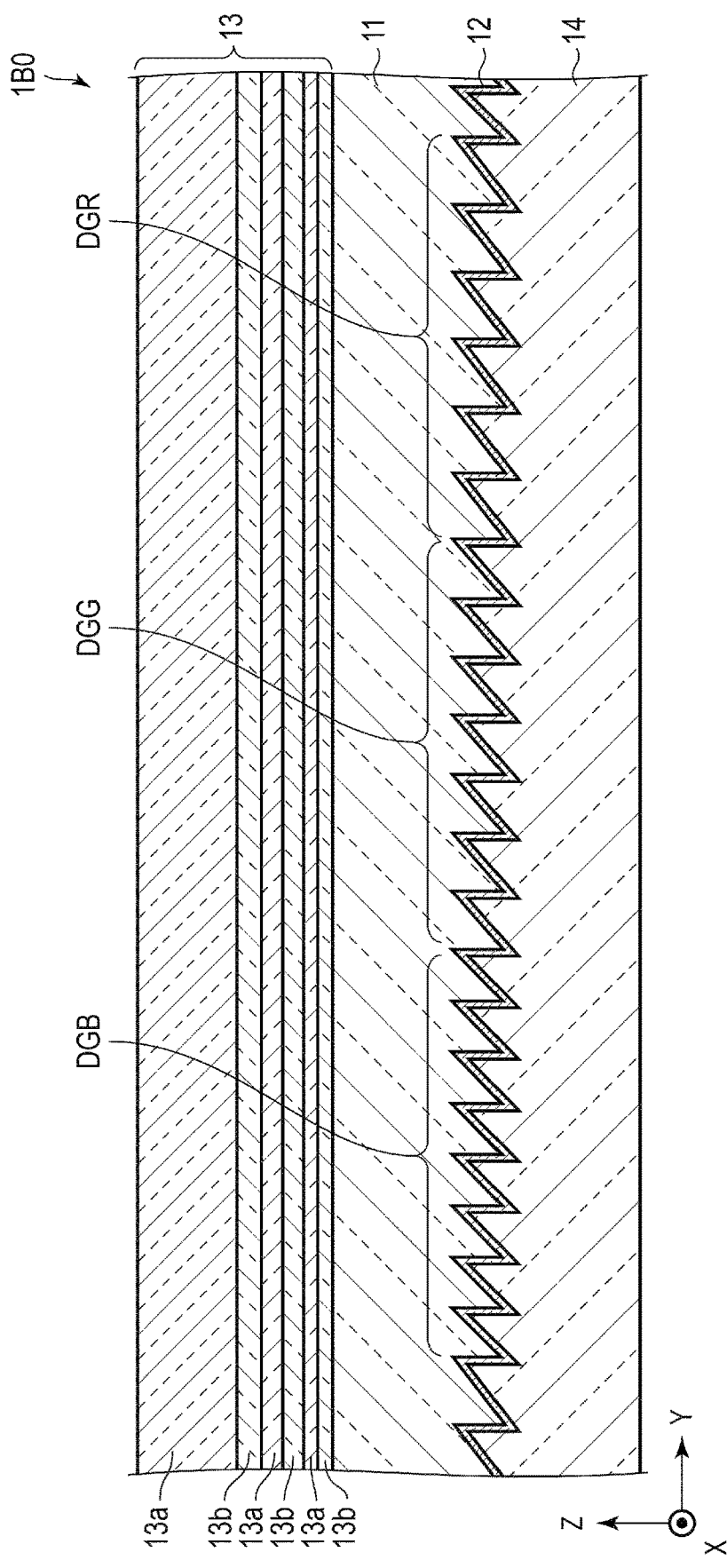
FIG. 7 is a schematic cross-sectional view illustrating a blank medium which can be used for manufacturing the display illustrated in FIG. 6.

FIG. 6 is a schematic cross-sectional view illustrating a display according to the second embodiment of the present invention. FIG. 7 is a schematic cross-sectional view illustrating a blank medium which can be used for manufacturing the display illustrated in FIG. 6.

The display 1B illustrated in FIG. 6 and the blank medium 1B0 illustrated in FIG. 7 are the same as the display 1A and the blank medium 1A0 in the first embodiment, respectively, except for the points described below.

The display 1B and the blank medium 1B0 are provided with a front layer 11, a reflective layer 12, and a back layer 14, instead of being provided with the front layers 11R, 11G, and 11B, the reflective layers 12R, 12G, and 12B, and the back layers 14R, 14G, and 14B.

The front layer 11 is provided on the back surface of the multilayer film 13. The front layer 11 may be made of, for example, a transparent resin. The transparent resin may be a cured product of a thermosetting resin or a photocurable resin, a thermoplastic resin, an adhesive or a pressure sensitive adhesive. The front layer 11 may have a monolayer structure, or may have a multilayer structure.

The back surface of the front layer 11 includes a plurality of regions, each of which is a first to third sub-region. These regions are regularly arranged on the back surface of the front layer 11. According to one example, each of these regions has a shape extending in the X direction and is arranged in the Y direction.

The first to third sub-regions are each provided with the first to third relief structures described in the first embodiment. According to one example, the first to third sub-regions each have a shape extending in the X direction and are arranged in the Y direction.

The first, second, and third relief structures form a first diffraction grating DGR, a second diffraction grating DGG, and a third diffraction grating DGB, respectively, on a reflective surface, which is an interface between the front layer 11 and the reflective layer 12. The first recess RR, the second recess RG, and the third recess RB are each provided at the first diffraction grating DGR, the second diffraction grating DGG, and the third diffraction grating DGB, respectively.

The reflective layer 12 covers the back surface of the front layer 11. As the reflective layer 12, for example, the materials exemplified for the reflective layer 12B may be used.

The back layer 14 covers the back surface of the reflective layer 12. The back layer 14 may be made of, for example, a transparent resin. The back layer 14 may be opaque. The resin constituting the back layer 14 may be a cured product of a thermosetting resin or a photocurable resin, a thermoplastic resin, an adhesive or a pressure sensitive adhesive.

One or two of the front layer 11, the reflective layer 12 and the back layer 14 may be omitted. However, when only the reflective layer 12 is omitted from these, materials having refractive indices different from each other are used for the front layer 11 and the back layer 14.

The display 1B is manufactured by the same method as described above for the display 1A except that the first recess RR, the second recess RG, and the third recess RB are formed at the positions where the first diffraction grating DGR, the second diffraction grating DGG, and the third diffraction grating DGB are disposed, respectively.

According to the second embodiment, effects similar to those of the first embodiment are obtained. Using metal as the material of the reflective layer 12 enables the display 1B in the second embodiment to display an image that is brighter than the display 1A in the first embodiment. Further, the display 1B in the second embodiment is easily formed thinner than the display 1A according to the first embodiment.

Next, a display-equipped article is described.

Figure 8:
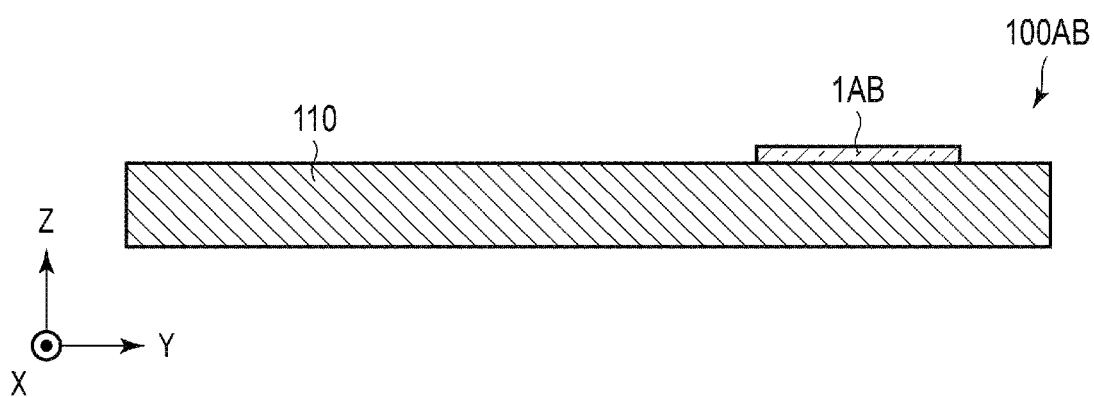
FIG. 8 is a schematic cross-sectional view illustrating a display-equipped article according to an embodiment of the present invention.

FIG. 8 is a schematic cross-sectional view illustrating a display-equipped article, according to an embodiment of the present invention. A display-equipped article 100AB may be, for example, a printed matter. The display-equipped article 100AB may be, for example, bank notes, securities, certificates, credit cards, personal authentication media, such as passports or ID (identification) cards, or packages with contents contained therein.

The display-equipped article 100AB includes a display 1AB and an article 110 retaining the display 1AB.

The article 110, when it is a printed matter, includes a print substrate and a print layer provided thereon. The material of the print substrate may be, for example, plastic, metal, paper, or a composite thereof.

The display 1AB is the display 1A or 1B described above. The display 1AB is retained by the article 110 so that the front surface of the display 1AB is adjacent to the outer portion of the display-equipped article 100AB. The display 1AB may be retained by the article 110, for example, by attaching the display 1AB to the front surface of the article 110 or embedding the display 1AB in the article 110.

The display-equipped article 100AB can be manufactured, for example, by manufacturing the display 1AB in advance and then retaining the display 1AB on the article 110. Alternatively, the display-equipped article 100AB can be manufactured by the following method.

Figure 9:
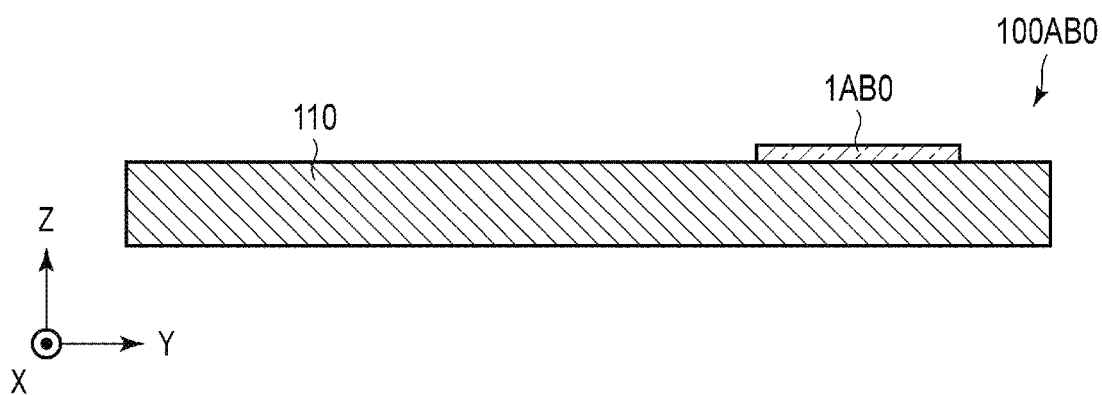
FIG. 9 is a schematic cross-sectional view illustrating a blank medium-equipped article, according to an embodiment of the present invention.

FIG. 9 is a schematic cross-sectional view illustrating a blank medium-equipped article according to an embodiment of the present invention.

The blank medium-equipped article 100AB0 shown in FIG. 9 has the same structure as that of the display-equipped article 100AB except that there are none of the first recess RR, the second recess RG, and the third recess RB are formed in the multilayer film 13. In other words, the blank medium-equipped article 100AB0 includes a blank-medium 1AB0 and the article 110 retaining the blank-medium 1AB0. The blank medium 1AB0 is the blank medium 1A0 or 1B0 described above.

The blank medium-equipped article 100AB0 may be prepared in advance, and the display-equipped article 100AB may be manufactured by irradiating the blank medium 1AB0 with a laser beam.

If the front surface of the laminate in which the first recess RR, the second recess RG and the third recess RB are formed is unprotected, this may lead to deformation of the recesses due to friction, or the like, upon using the display 1A, 1B, or 1AB or the display-equipped article 100AB. Hence, a protective layer made of a transparent material is preferably provided on the front surface of the laminate.

The protective layer may cover only the front surface of the laminate, or may cover the front surface of the display 1AB and the front surface of the article 110.

A thick protective layer does not affect interference in the multilayer film 13 On the other hand, a thin protective layer may affect interference in the multilayer film 13. In the latter case, the protective film is used as a part of the multilayer film 13. Therefore, in this case, the multilayer film 13 is designed to exhibit the optical properties described above in a state in which the protective layer is included.

EXAMPLES

Examples of the present invention will be described below.

A display having a structure similar to that of the display 1A described with reference to FIG. 1 was manufactured.

The multilayer film 13 was composed of one dielectric layer 13a and one dielectric layer 13b. The dielectric layer 13a was made of a material having a refractive index of 1.98 and a thickness of 700 nm. The dielectric layer 13b was made of a material having a refractive index of 1.28 and a thickness of 650 nm.

A first recess RR was formed so that the thickness of a first portion was 600 nm. A second recess RG was formed so that the thickness of a second portion was 300 nm. A third recess RB was formed so that the thickness of a third portion was 200 nm.

The dielectric layer 13a had a protective layer formed thereon. A material having a refractive index of 2.5 was used as the material of the protective layer, and its thickness was sufficiently large so as not to affect interference in the multilayer film 13.

A first blazed diffraction grating was formed so that the spatial frequency of the grating line was 1150 lines/mm. A second blazed diffraction grating was formed so that the spatial frequency of the grating line was 1320 lines/mm. A third blazed diffraction grating was formed so that the spatial frequency of the grating line was 1550 lines/mm.

Figure 11:
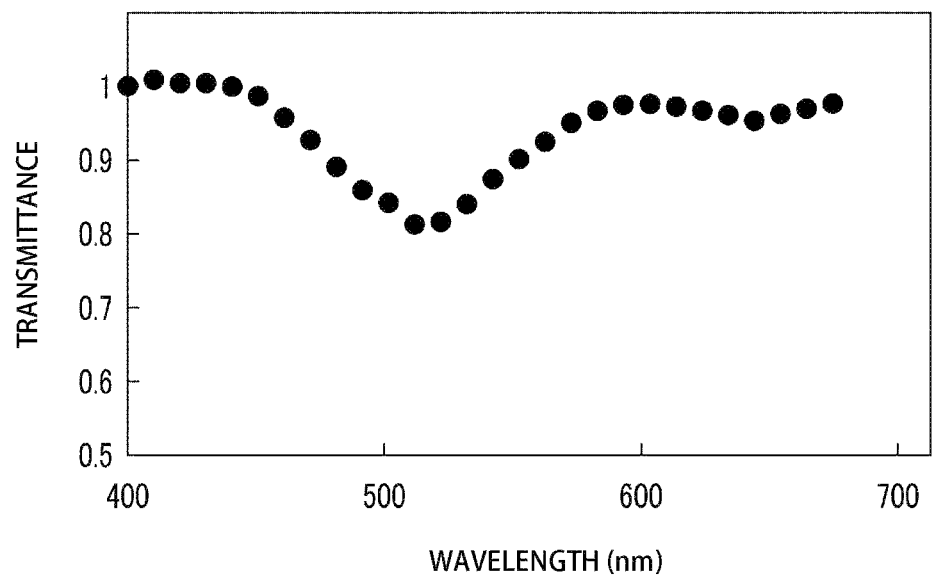
FIG. 11 is a graph illustrating another example of a transmission spectrum of a portion of a multilayer film aligned with a recess, obtained by computer simulation.
Figure 12:
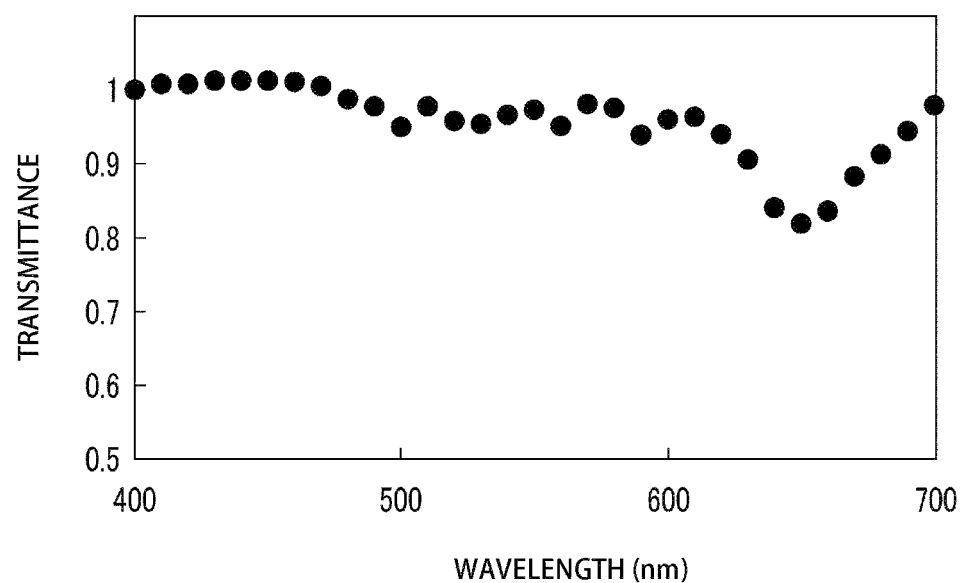
FIG. 12 is a graph illustrating still another example of a transmission spectrum of a portion of a multilayer film aligned with a recess, obtained by computer simulation.

Computer simulation was used to obtain a transmission spectrum of the multilayer film 13 having the above structure when illuminated with white light from the normal direction. The results are shown in FIGS. 10 to 12.

Figure 10:
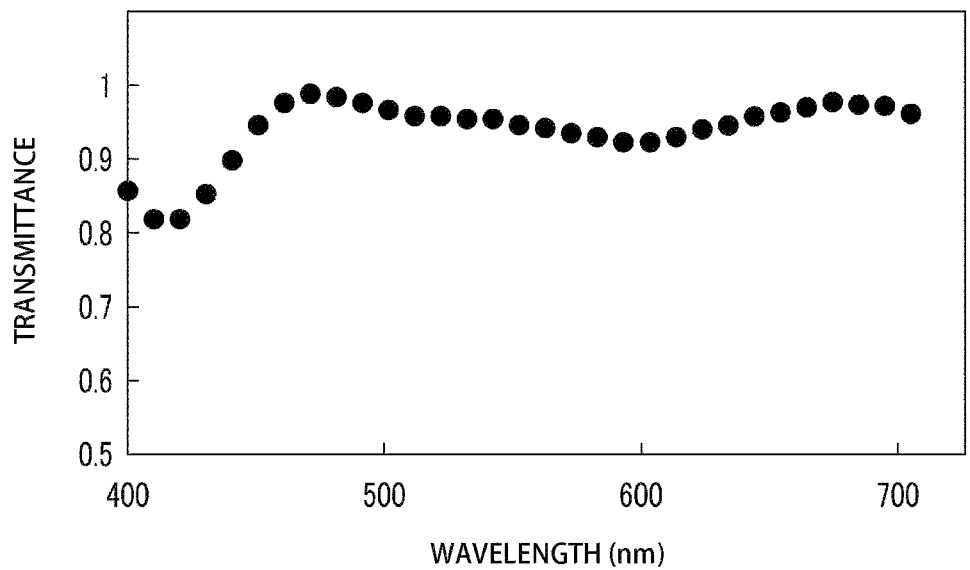
FIG. 10 is a graph illustrating an example of a transmission spectrum of a portion of a multilayer film aligned with a recess, obtained by computer simulation.

FIG. 10 is a graph showing a transmission spectrum of the third portion of the multilayer film 13 aligned with the third recess RB, obtained by computer simulation. FIG. 11 is a graph showing a transmission spectrum of the third portion of the multilayer film 13 aligned with the second recess RG, obtained by computer simulation. FIG. 12 is a graph showing a transmission spectrum of the third portion of the multilayer film 13 aligned with the first recess RR, obtained by computer simulation.

Although not shown, the transmittance of the portion of the multilayer film 13 having no recesses is substantially constant over the entire visible range.

On the other hand, in the transmission spectrum shown in FIG. 10, the transmittance of the blue region is lower than that of other wavelength ranges in the visible range. Therefore, the light transmitted through the third portion has a low intensity in the blue region and a high intensity in the green and red regions. Therefore, the light transmitted through the third portion appears yellow.

On the other hand, in the transmission spectrum shown in FIG. 11, the transmittance of the green region is lower than that of other wavelength ranges in the visible range. Therefore, the light transmitted through the second portion has a low intensity in the green region and a high intensity in the blue and red regions. Therefore, the light transmitted through the second portion appears magenta.

In the transmission spectrum shown in FIG. 12, the transmittance of the red region is lower than that of other wavelength ranges in the visible range. The light transmitted through the first portion has a low intensity in the red region and a high intensity in the blue and green regions. Therefore, the light transmitted through the first portion appears cyan.

On the other hand, the first, second, and third blazed diffraction gratings emit strong red, green, and blue first-order diffracted light in the same direction inclined to the normal direction when illuminated with white light from the normal direction, respectively. In other words, the combination of the first, second, and third blazed diffraction gratings has a substantially uniform reflectance over substantially the entire visible range, and functions as a reflective surface which reflects incident light at an angle of reflection different from the angle of incidence thereof.

Therefore, this display should be able to display a color image, as a diffracted image, having a pattern corresponding to the arrangement of the first recess RR, second recess RG, and third recess RB.

In fact, through observation of the display manufactured as described above being illuminated with white light, it was confirmed that this display is capable of displaying an expected color image as a diffracted image.

Although blazed diffraction gratings are used in the above embodiments, the present invention is not limited to blazed diffraction gratings, but holographic diffraction gratings and laminar diffraction gratings may also be used.

[Reference Signs List] 1A . . . Display; 1A0 . . . Blank medium; 1AB . . . Display; 1AB0 . . . Blank medium; 1B . . . Display; 1B0 . . . Blank medium; 11 . . . Front layer; 11B . . . Front layer; 11G . . . Front layer; 11R . . . Front layer; 12 . . . Reflective layer; 12B . . . Reflective layer; 12G . . . Reflective layer; 12R . . . Reflective layer; 13 . . . Multilayer film; 13a . . . Dielectric layer; 13b . . . . Dielectric layer; 14 . . . Back layer; 14B . . . Back layer; 14G . . . Back layer; 14R . . . Back layer; 100AB . . . Display-equipped article' 100AB0 . . . Blank medium-equipped article; 110 . . . Article; DG . . . First reflective surface; DGB . . . Third diffraction grating; DGG . . . Second diffraction grating; DGR . . . First diffraction grating; L1 . . . White light; L2 . . . Light; L3 . . . Light; LB . . . Laser beam; LS . . . Light source; OB . . . Observer; OL . . . Objective lens; RB . . . Third recess; REF . . . Reflective surface; RG . . . Second recess; RR . . . First recess.

What is claimed is:

1. A display, comprising:
   a multilayer film comprising a laminate of at least two dielectric layers having refractive indices different from each other, the laminate having a front surface and a back surface, the laminate having at least one recess in the front surface; and
   at least one reflective surface which faces the back surface of the laminate, and is configured to direct light in a visible range, which has entered the multilayer film and then emerged at an angle of emergence from the back surface, to be incident on the back surface at an angle of incidence which is different from the angle of emergence of the light, wherein
   the at least one recess is on a first dielectric layer of the at least two dielectric layers, said first dielectric layer is closest to the front surface of the laminate, and
   the multilayer film comprises a plurality of portions, said plurality of portions comprises a portion aligned with the at least one recess and at least one portion with no recess, wherein each portion of said plurality of portions shows a transmission spectrum distinct from a transmission spectrum shown by any other portion of said plurality of portions when white light is made incident at a first angle of incidence on the multilayer film.

2. The display of claim 1, wherein the at least one reflective surface includes a diffraction grating.

3. The display of claim 1, wherein the at least one recess includes a first recess and a second recess having a depth different from a depth of the first recess, wherein said plurality of portions comprises a first portion aligned with the first recess and a second portion aligned with the second recess.

4. The display of claim 3, wherein the at least one reflective surface comprises
   a first reflective surface which has a first diffraction grating and a visible light transmissivity, and a second reflective surface which has a second diffraction grating having a grating constant different from that of the first diffraction grating, the second reflective surface facing the back surface of the laminate with the first reflective surface interposed therebetween.

5. The display of claim 3, wherein
   the at least one reflective surface includes a reflective surface provided with a first diffraction grating and a second diffraction grating which are aligned with the first recess and the second recess, respectively, and the first diffraction grating and the second diffraction grating each having a grating constant different from each other.

6. A display-equipped article, comprising:
   the display of claim 1; and
   an article retaining the display.

7. A method of manufacturing a display, comprising a step of irradiating with a laser beam a blank medium comprising:
   a multilayer film comprising a laminate of at least two dielectric layers having refractive indices different from each other, the laminate having a front surface and a back surface; and
   at least one reflective surface which faces the back surface of the laminate, and is configured to direct light in a visible range, which has emerged at an angle of emergence from the back surface, to be incident on the second major surface at an angle of incidence which is different from the angle of emergence of the light,
   wherein said irradiating forms at least one recess the at least one recess on a first dielectric layer of the at least two dielectric layers, said first dielectric layer is closest to the front surface of the laminate, and
   the multilayer film comprises a plurality of portions, said plurality of portions comprises a portion aligned with the at least one recess and at least one portion with no recess, wherein each portion of said plurality of portions shows a transmission spectrum distinct from a transmission spectrum shown by any other portion of said plurality of portions when white light is made incident at a first angle of incidence on the multilayer film.

8. A method of manufacturing a display-equipped article, comprising:
   manufacturing a display using the method of claim 7; and
   retaining the display on an article.

9. The method of claim 7, wherein the at least one reflective surface includes a diffraction grating.

10. The method of claim 9, wherein the at least one reflective surface comprises
    a first reflective surface which has a first diffraction grating and a visible light transmissivity, and a second reflective surface which has a second diffraction grating having a grating constant different from that of the first diffraction grating, the second reflective surface facing the back surface of the laminate with the first reflective surface interposed therebetween.

11. The method of claim 9, wherein
    the at least one reflective surface includes a reflective surface provided with a first diffraction grating and a second diffraction grating, and the first diffraction grating and the second diffraction grating each having a grating constant different from each other.

12. The display of claim 1, wherein the first dielectric layer is an outermost layer of the display.

13. The method of claim 7, wherein the first dielectric layer is an outermost layer of the display.

* * * * *